United States Patent Office 3,451,863
Patented June 24, 1969

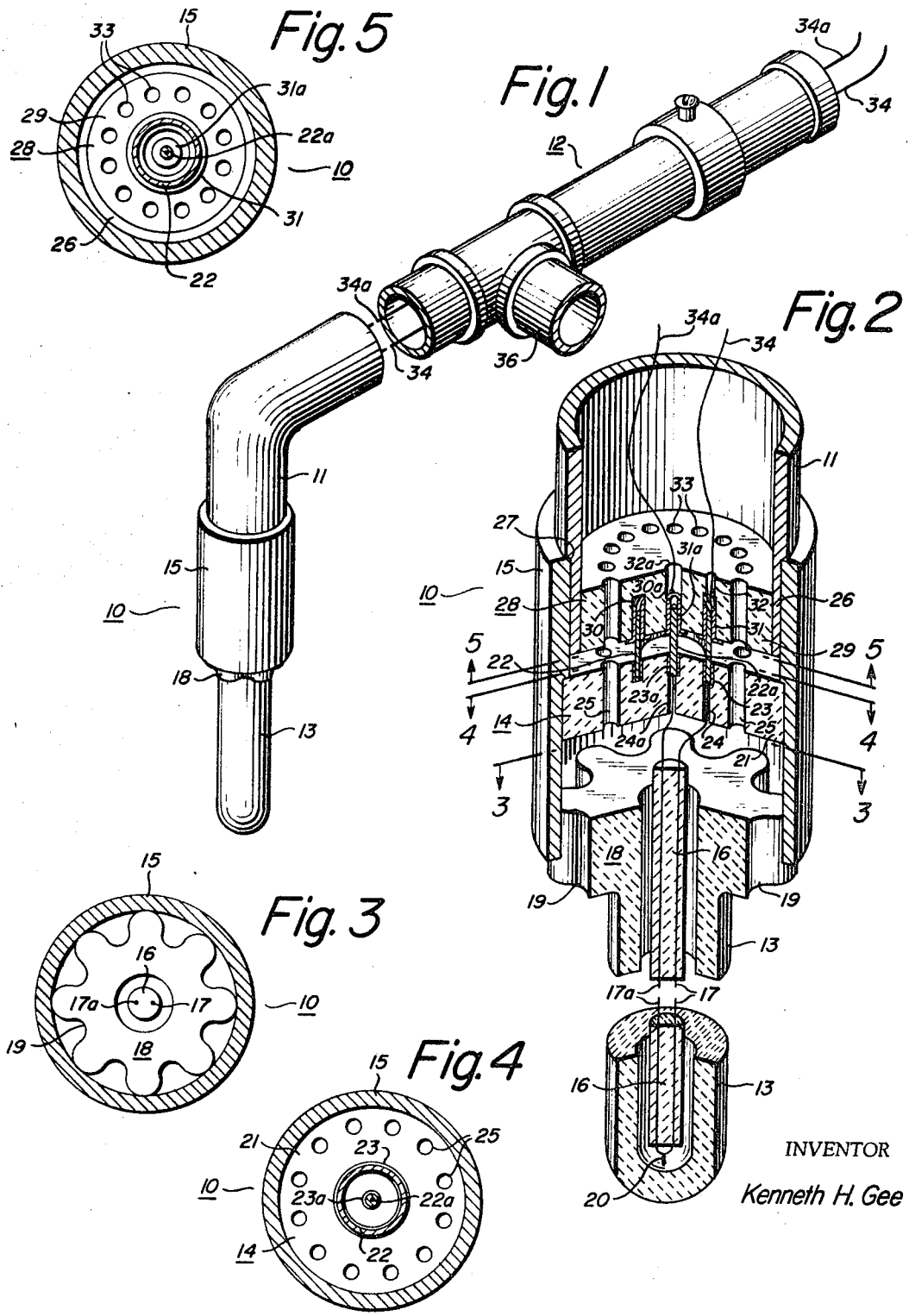

3,451,863
SINGLE-CAST IMMERSION THERMOCOUPLE FOR CONTINUOUS MEASUREMENT OF MOLTEN METAL TEMPERATURES
Kenneth H. Gee, Bethlehem, Pa., assignor to Bethlehem Steel Corporation, a corporation of Delaware
Filed July 7, 1965, Ser. No. 470,117
Int. Cl. H01v 1/04
U.S. Cl. 136—234                            6 Claims

ABSTRACT OF THE DISCLOSURE

A disposable air-cooled thermocouple assembly including a protection tube having an enlarged upper shoulder, a mounting collar disposed around and extending upwardly from the protection tube shoulder, a connector block assembly mounted within but spaced from the upper end of the mounting collar and having a pair of contact members, an insulator disposed within the protection tube, and thermoelement wires extending from the connector block contact members downwardly through the insulator to the lower end of the protection tube where they join to form a hot junction. The assembly mounting collar is adapted to fit the lower end of a housing which includes thermocouple lead wires and a connector block having contacts that connect with the lead wires and are adapted to mate with the contacts of the thermocouple assembly connector block. Apertures in the housing connector block allow cooling and purging air conveyed to the housing to pass to the disposable thermocouple assembly. Apertures in the thermocouple assembly connector block permit air from the housing to pass through the assembly to the shoulder of the protection tube which contains means to allow the air to pass from the thermocouple assembly.

---

This invention relates to an improved thermocouple and more particularly to an improved expendable, immersion-type thermocouple for measuring the temperature of molten iron or other metals.

The present invention is particularly adapted for use in determining the temperature of molten iron as it is being cast from a blast furnace. In application Ser. No. 213,820, now U.S. Patent No. 3,328,162, filed July 31, 1962, entitled "Iron Temperature Method of Controlling Blast Furnace," there is described a method of blast furnace control using iron temperature, as continuously measured during a cast, as a basis for adjustment of the thermal balance of the furnace to maintain the furnace temperature within proper range. The success of the blast furnace control method described in the above mentioned application is dependent upon a device which will accurately measure extremely elevated temperatures for the duration of an iron cast, a period which generally lasts about forty minutes, but which may exceed an hour. For numerous reasons, optical pyrometers have proven unsatisfactory for this form of measurement. The immersion-type thermocouples which are available are unsatisfactory for continuous temperature measurement because they have no provision for cooling and, therefore, have only a relatively short period of life. In application Ser. No. 118,454, now United States Patent No. 3,278,341, filed June 20, 1961, entitled "Thermocouple Device for Measuring the Temperature of Molten Metal," there is described an immersion thermocouple device which has proven highly accurate for continuously determining the temperature of blast furnace iron during casting. That immersion thermocouple device is air cooled, and has a high temperature duty casing comprising a graphite outer protection tube and a high alumina inner protection tube. The device can accurately and continuously measure the temperature of molten metal for an extended period, but the parts are relatively expensive, and easily broken if not handled carefully. In addition, the replacement of the casing and/or its parts and the renewal of the hot junction of the thermocouple are maintenance operations requiring trained personnel.

Accordingly, it is an object of this invention to provide a simple, compact, and inexpensive, expendable immersion thermocouple device which is highly accurate at extremely elevated temperatures.

It is another object of this invention to provide an immersion thermocouple device which can be readily used and easily maintained by furnace-operating personnel with a minimum of training.

It is a further object of this invention to provide an expendable thermocouple device which can withstand immersion in molten metal for a relatively long period of time and which can be easily and rapidly removed from its supporting handle after use and thereafter replaced by another thermocouple device.

It has been discovered that the foregoing objects can be attained by providing a small expendable quick-disconnect thermocouple unit which is adapted to be air-cooled to protect it from the heat of molten metal.

Referring to the drawings:

FIG. 1 is a perspective view partly in section showing the thermocouple unit of the present invention positioned at the end of a handle assembly.

FIG. 2 is an enlarged perspective sectional view of the thermocouple of the present invention showing details of construction.

FIG. 3 is a sectional view taken along the line 3—3 of FIG. 2.

FIG. 4 is a sectional view taken along the line 4—4 of FIG. 2.

FIG. 5 is a sectional view taken along the line 5—5 of FIG. 2.

Referring to FIG. 1 and 2 the invention has been shown in one form as applied to a replaceable thermocouple unit 10 joined to the lower end of an L-shaped housing 11 which is a part of elongated handle assembly 12.

Thermocouple unit 10 comprises protection tube 13, connector block assembly 14, mounting collar 15, insulator 16, and thermoelement wires 17 and 17a all assembled in a compact manner.

Protection tube 13, preferably of cylindrical shape, has its lower end closed and its upper end open and is made of silica or other suitable material capable of withstanding extremely high temperatures. The upper end of tube 13 is formed with an enlarged shoulder 18 for the purpose of rapidly dissipating heat. Suitable means are provided, as for example grooves 19, in shoulder 18 to increase its surface area and provide for the passage of cooling and purging air from thermocouple unit 10 as hereinafter more fully described. Disposed within protection tube 13 is two-holded insulator 16, of conventional design, through which pass, longitudinally thereof, thermoelement wires 17 and 17a. Wires 17 and 17a are joned at their lower ends to form hot junction 20.

Mounting collar 15, of heat resistant material, is disposed around protection tube shoulder 18 with the lower edge of collar 15 preferably extending close to the lower edge of shoulder 18. Shoulder 18 is secured within the lower end of mounting collar 15 in any suitable manner, as by a press fit or by crimping the lower end of collar 15 around shoulder 18. Mounted within collar 15, intermediate the upper and lower ends thereof and spaced from the upper end of tube 13 is connector block assembly 14. Connector block assembly 14 comprises insulator disc 21 and male contact members 22 and 22a which project upwardly therefrom. Male contact members 22 and 22a are pressed into sockets 23 and 23a, respectively, in disc 21. Member 22a is in the form of a pin while member 22 is in the form of a ring. Extending downwardly from the bottom of sockets 23 and 23a to the lower side of disc 21 are passages 24 and 24a, respectively. The upper ends of thermoelement wires 17 and 17a extend above insulator 16 and through passages 24 and 24a, respectively, in disc 21 and are connected to the lower ends of male contact members 22 and 22a, respectively. Disc 21 is preferably made from a refractory insulating material and contains a plurality of apertures 25 for the passage of cooling and purging air.

The outside lower portion 26 of handle housing 11 has been undercut to form shoulder stop 27. Handle housing connector block assembly 28 is secured within the lower end of housing 11 in any suitable manner, as by a threaded connection, press fit or by means of set screws. Handle housing connector block assembly disc 29, preferably made of the same refractory insulating material as mounting collar connector block assembly disc 21, has a pair of sockets 30 and 30a in its underside, and contains a plurality of apertures 33 extending therethrough for the passage of cooling and purging air. Female contact members 31 and 31a are pressed into sockets 30 and 30a, respectively, and are adapted to receive the male contact members 22 and 22a, respectively, which project upwardly from mounting collar connector block assembly 14. Extending upwardly from the tops of sockets 30 and 30a to the upper side of disc 29 are passages 32 and 32a, respectively. Lead wires 34 and 34a are connected to female contact members 31 and 31a, respectively, and extend upwardly through disc passages 32 and 32a, respectively, through housing 11, and through out of the back end of handle 12 to a suitable temperature recording instrument, not shown. Purging and cooling fluid, such as air, from a source not shown, is delivered to handle 12 through pipe 36.

To operatively mount a replaceable thermocouple unit 10 on handle assembly housing 11, the upper end of mounting collar 15 is pressed over the undercut lower portion 26 of housing 11 until the upper edge of collar 15 comes in contact with shoulder 27. In the process male contact members 22 and 22a, which project upwardly from mounting collar connector block assembly 14, enter female contact members 31 and 31a of handle housing connector block assembly 28 and eletcrically connect thermoelement wires 17 and 17a of thermocouple unit 10 to the lead wires 34 and 34a, respectively, of handle 12.

After a thermocouple unit 10 is mounted on housing 11 of handle assembly 12, and prior to immersion in a molten metal bath, cooling and purging fluid under a positive pressure is delivered through pipe 36 to handle assembly 12. The cooling and purging fluid passes from handle assembly housing 11 through apertures 33 in connector block assembly disc 29, and into thermocouple unit 10. Thereafter, the cooling and purging fluid passes through apertures 25 of mounting collar connector block assembly disc 21 and out of thermocouple unit 10 through the grooves 19 in protection tube shoulder 18. It will be understood that the cooling and purging fluid prevents the lead wires of the handle and thermoelement wires of the thermocouple unit from overheating, cools the handle and thermocouple unit, and provides a constant source of uncontaminated purge fluid which prevents contamination of the thermocouple unit by the dirt and gases normally present in the vicinity of molten metal. By cooling thermocouple unit 10 in this manner it can be immersed for an extended period in molten metal to continuously and accurately measure its temperature.

In the embodiment of my invention shown in detail in FIG. 2, protection tube 13 is made of a fused cast silica grain (99.9% silicon) which is bonded and refired in the desired form. Tubes of this composition are available on the market under the name of "Lavasil 999," a product of Lava Crucible Refractories Co. The overall length of tube 13 is 5" including shoulder 18 which is 1" high. Tube 13 has an outside diameter of 5/8" and an inside diameter of 1/4". Shoulders 18 has an outside diameter of approximately 7/8" and grooves 19 are approximately 3/32" deep. Two-hole insulator 16 is made of high alumina refractory and the thermoelement wires 17 and 17a are platinum-rhodium and platinum, respectively. Connector disc 21 is made of porcelain, the apertures 25 therein are 1/8" in diameter, and the connectors 22 and 22a are copper and I.S.A. Alloy 11, respectively. The inside diameter of the lower end of mounting collar 15 is slightly smaller than the outside diameter of tube shoulder 18, and the inside diameter of the upper end of mounting collar 15 is slightly smaller than the outside diameter of the lower portion 26 of housing 11 so that these members can be assembled by hand by simply pressing protection tube shoulder 18 and housing 11 into the proper ends of collar 15. Mounting collar 15 is 6" long and made of thin gauge sheet metal of high heat resistance. For additional protection during immersion in molten metal, housing 11 and mounting collar 15 are coated with an air setting refractory mortar, such as "Adamant." Connector block assembly 21 is polarized, i.e., the male contact members 22 and 22a therein are adapted to be engaged by the contact members 31 and 31a, respectively, of housing connector assembly 28 without rotational orientation of the expendable thermocouple unit 10 as it is fitted to handle housing 11. This is accomplished by having male contact member 22a of a pin-type configuration and male contact member 22 in the shape of a ring. This arrangement provides for proper alignment of the contacts as to polarity at all times.

Thermocouple elements have been assembled in accordance with the above description and as illustrated in FIG. 1 to form disposable thermocouple units capable of measuring temperatures above 2000° F. These units have been used successfully to continuously and accurately measure, for the duration of a cast, the temperature of molten iron being cast from a blast furnace. The temperatures measured exceeded 2700° F., and several of the cast periods exceeded one hour without failure of the units during that time. After use the thermocouple units were easily removed from the handle and replaced by new units by furnace personnel.

The expendable thermocouple units of this invention provide a compact, relatively inexpensive assembly which, because of the incrporated cooling features, perform satisfactorily for extended periods while immersed in molten metal.

While one embodiment of my invention has been illustrated and described, it will be understood that other adaptations and modifications may be made without departure from the spirit of the invention or the scope of the appended claims.

I claim:
1. Thermocouple assembly comprising:
 (A) a housing,
 (B) a first pair of electrical contacts mounted in said housing,
 (C) means to supply cooling fluid to the interior of said housing and out the lower end thereof,
 (D) a collar removably secured to said housing and extending below the end thereof,
 (E) a second pair of electrical contacts mounted in and supported by said collar and in engagement with said first pair of contacts,
 (F) a heat-resistant protection tube mounted in said collar and extending below the end thereof,
 (G) a pair of thermoelement wires extending from said second pair of contacts in said collar into said tube and connected at the lower end of said tube to form a hot junction,
(H) means adjacent the upper end of said tube to permit passage of cooling fluid from the interior of said collar to the outside atmosphere.

2. A replaceable thermocouple assembly for use with a housing having spaced thermoelement lead wire contact means therein and having means to pass purging and cooling fluid through and out of the lower end of said housing comprising:
(A) a mounting collar having its upper end adapted to be secured to said housing,
(B) spaced contact means, mounted in and supported by said collar, adapted to engage said housing contact means,
(C) a heat resistant refractory protection tube extending downwardly from the lower end of said mounting collar,
(D) means adjacent the upper end of said tube to permit the passage of purging and cooling fluid from the interior of said collar to the outside atmosphere,
(E) thermoelement wires, having their upper ends connected to said collar contact means, extending downwardly into said protection tube and joined at their lower ends to form a hot junction.

3. A replaceable thermocouple assembly for use with a housing having spaced thermoelement lead wire contact means therein and having means to pass purging and cooling fluid through and out of the lower end of said housing comprising:
(A) a mounting collar having its upper end adapted to be secured to said housing,
(B) an insulator disc mounted within and supported by said mounting collar,
(C) openings in said disc for the passage of purging and cooling fluid,
(D) spaced contact means mounted in said disc and adapted to engage said housing contact means,
(E) a heat resistant refractory protection tube extending downwardly from the lower end of said mounting collar,
(F) means adjacent the upper end of said tube to permit the passage of purging and cooling fluid from the interior of said collar to the outside atmosphere,
(G) an insulator disposed within said protection tube,
(H) thermoelement wires, having their upper ends connected to said collar contact means, extending downwardly into said protection tube and through said insulator and joined at their lower end to form a hot junction.

4. A replaceable thermocouple assembly, adapted to be secured to a housing having at the lower end thereof a connector disc with thermoelement lead wire contact means and means to pass purging and cooling fluid therethrough comprising:
(A) a mounting collar having its upper end adapted to be secured to said housing,
(B) a connector block assembly, mounted within and supported by said mounting collar adjacent to but spaced from the upper end thereof, comprising:
(1) an insulator disc comprising:
(a) means therein for the passage of purging and cooling fluid,
(2) spaced contact means adapted to cooperate with said connector disc contact means,
(C) a heat resistant refractory protection tube, extending downwardly from the lower end of said mounting collar, having its upper end open and its lower end closed and having a shoulder at the upper end thereof,
(D) means adjacent the top of said tube to permit the passage of purging and cooling fluid from said thermocouple assembly,
(E) an insulator disposed within said protection tube,
(F) thermoelement wires passing through a portion of said thermocouple assembly and extending through said insulator, said wires having their upper ends connected to said connector block assembly insulator disc contact means and their lower ends joined to form a hot junction.

5. A replaceable thermocouple assembly, adapted to be secured to a handle housing having at the lower end thereof a connector disc with polarized thermoelement lead wire contact means and means to pass purging and cooling fluid into said thermocouple assembly, for measuring the temperature of molten metal above 2000° F. comprising:
(A) a heat resistant mounting collar having its upper end adapted to be secured to said handle housing,
(B) a connector block assembly mounted within and supported by said mounting collar adjacent to but spaced from the upper end thereof, comprising:
(1) an insulator disc comprising:
(a) a plurality of apertures extending through said disc for the passage of purging and cooling fluid,
(b) socket means extending downwardly from the upper face of said insulator disc,
(c) passage means extending downwardly from the lower portion of said socket means to the lower face of said insulator disc,
(2) polarized contact means, adapted to cooperate with said handle housing contact means, mounted in said insulator disc sockets,
(C) a heat resistant refractory protection tube, extending downwardly from the lower end of said mounting collar, having its upper end open and its lower end closed and having:
(1) a shoulder at the upper end thereof, at least partially disposed within said mounting collar, having
(a) means extending through said shoulder to permit the passage of purging and cooling fluid from said thermocouple assembly,
(D) an insulator disposed within said protection tube,
(E) thermoelement wires passing through a portion of said thermocouple assembly and extending through said insulator and at least partially through said insulator disc passage means, said wires having their upper ends connected to said connector block assembly contact means and their lower ends joined to form a hot junction.

6. A replaceable thermocouple assembly according to claim 5 wherein said protection tube shoulder means, for permitting the passage of purging and cooling fluid from said thermocouple, constitutes grooves spaced around the periphery of said shoulder and extending from the top to the bottom thereof.

References Cited
UNITED STATES PATENTS
2,963,532   12/1960   Bell _____ 136—234 X
3,334,520   8/1967   Putman _____ 73—359

OTHER REFERENCES
Holtby, F.: "Rapid Temp. Measurements of Molten Iron and Steel With an Immersion Thermocouple," Transactions of the Am. Soc. for Metals, vol. 29, December 1941, pages 877, 878, 879 relied on.

A. B. CURTIS, *Primary Examiner.*

M. J. ANDREWS, *Assistant Examiner.*